Sept. 13, 1955     E. L. SCHEIDENHELM ET AL     2,717,479
DISK HARROW FRAME ADJUSTMENT
Filed Aug. 30, 1950     3 Sheets-Sheet 1
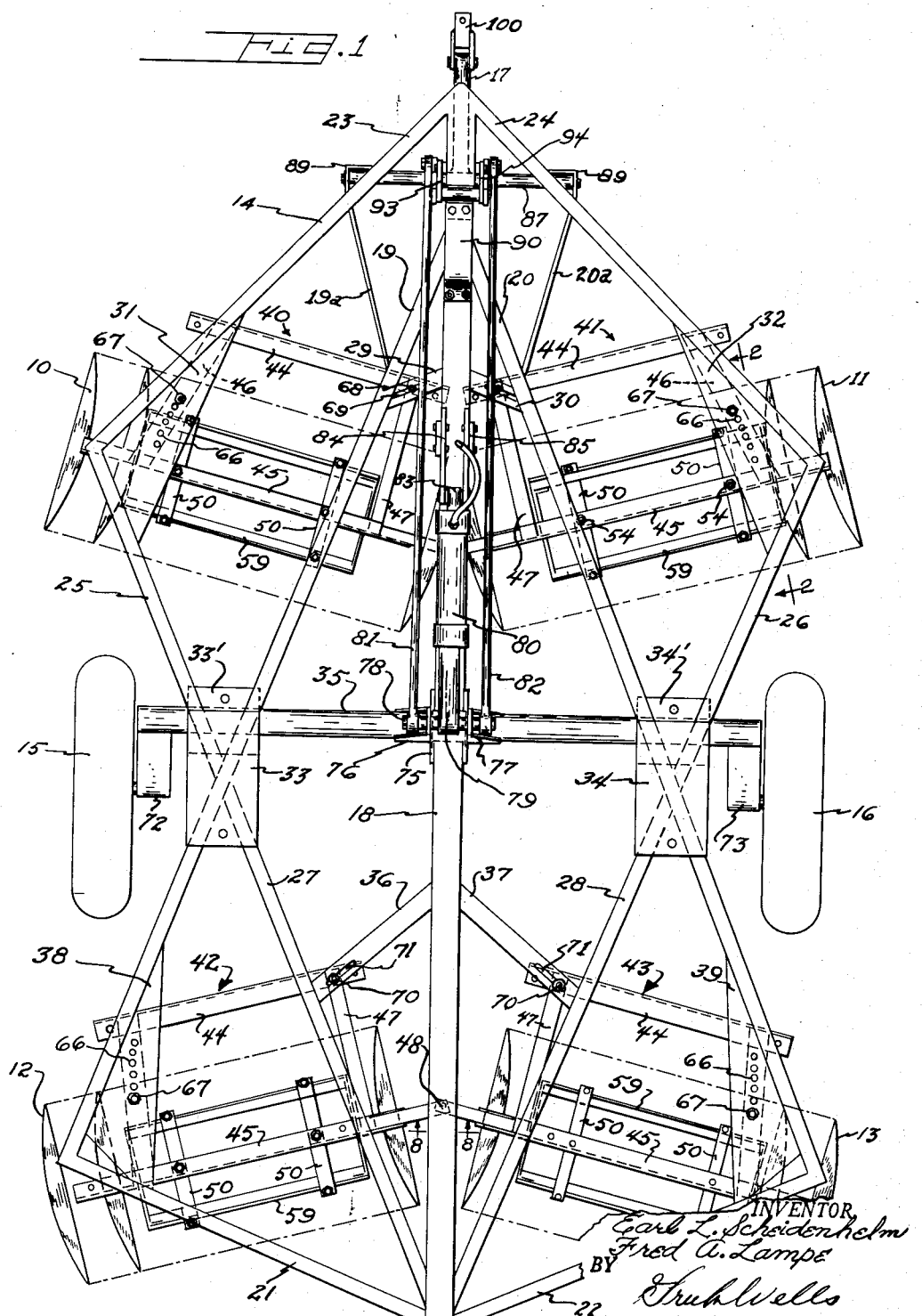

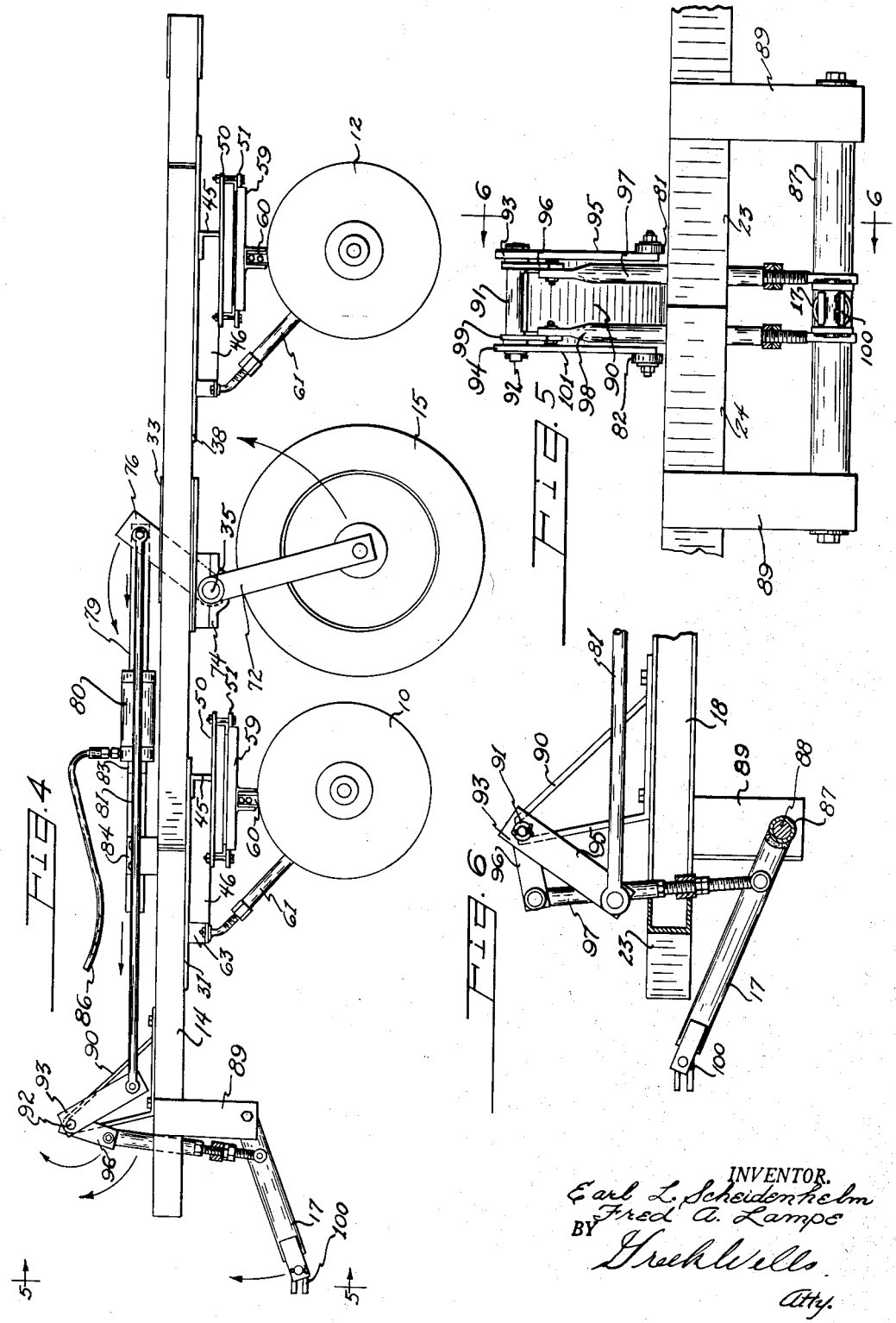

Sept. 13, 1955  E. L. SCHEIDENHELM ET AL  2,717,479
DISK HARROW FRAME ADJUSTMENT
Filed Aug. 30, 1950  3 Sheets-Sheet 3
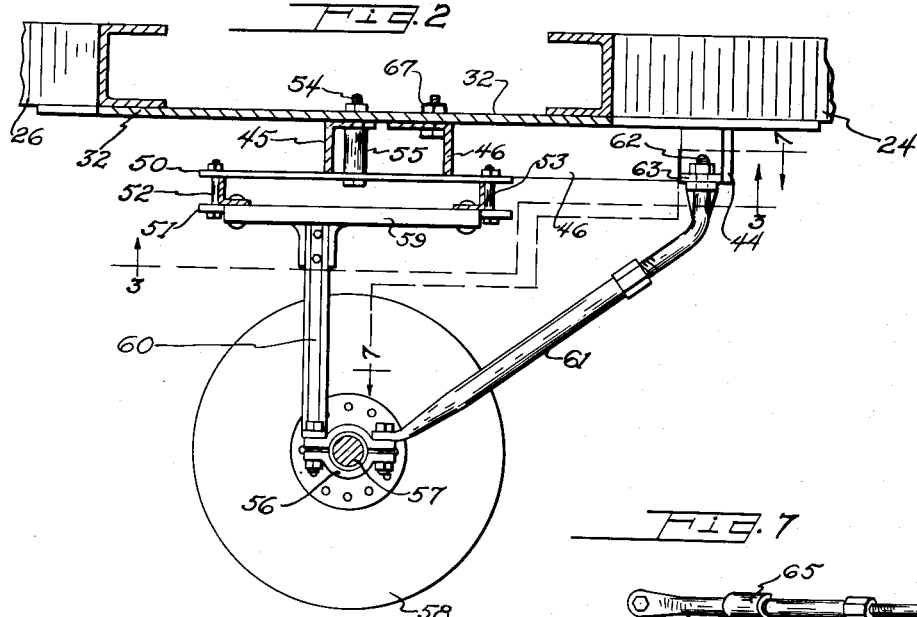
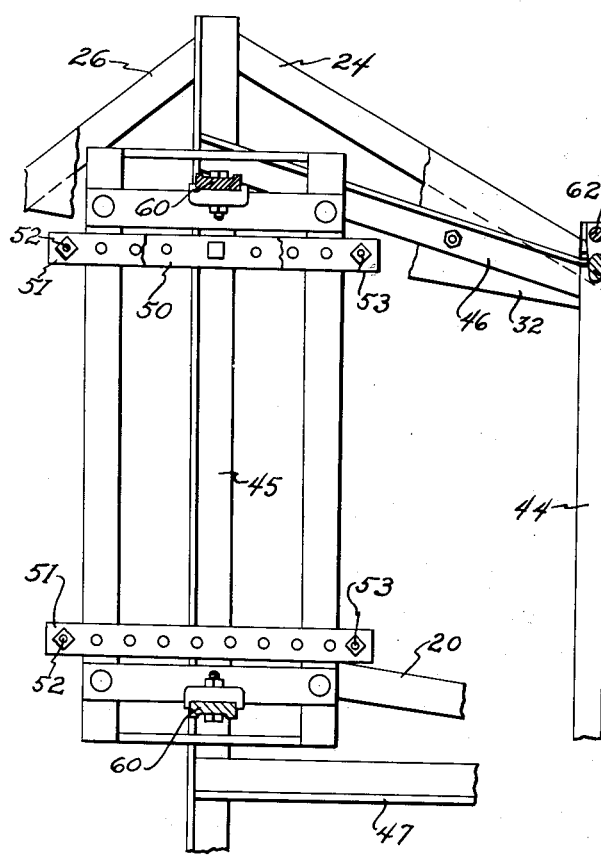
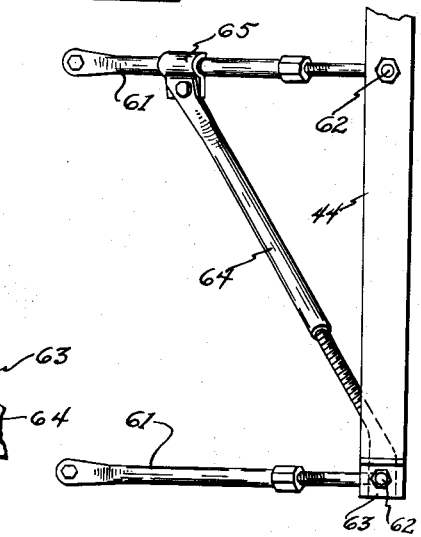
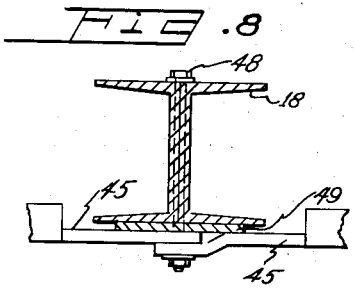
INVENTOR.
Earl L. Scheidenhelm
Fred A. Lampe
BY Fred Wells
Atty.

United States Patent Office 2,717,479
Patented Sept. 13, 1955

2,717,479
DISK HARROW FRAME ADJUSTMENT

Earl L. Scheidenhelm and Fred A. Lampe, Mendota, Ill., assignors to Horace D. Hume, Mendota, Ill.

Application August 30, 1950, Serial No. 182,188

2 Claims. (Cl. 55—83)

Our invention relates to improvements in a disk harrow frame adjustment.

It is the principal purpose of our invention to provide a framework for mounting gangs of cultivating disks and attaching them to a pulling vehicle such as a tractor whereby the disk gangs can be raised and lowered in such a fashion as to maintain them at the proper levels and whereby the individual gangs are readily adjusted and set at any particular angle to the direction of travel that may be desired.

More particularly it is a purpose of our invention to provide a novel frame for disk harrow gangs with means to attach the gangs to the frame and means to elevate and lower the frame with respect to the towing vehicle connection and the support wheels of the frame, in such a way as to maintain a predetermined relative height of the front gangs and rear gangs of disks even though the depth to which the disks are set to penetrate the soil may be varied.

Our invention is embodied in a machine which employs four standard disk gangs of a type now commonly used. Each of these gangs has a framework, the top of which is often used to support additional weights that are necessary to get the disks to penetrate the soil. Our improved disk harrow frame comprises a rigid framework which is supported by two wheels rearwardly of the center of gravity, and by a tow bar that is connected to the towing vehicle such as a tractor. The rigid framework is provided with pairs of auxiliary frames that are clamped to the standard frameworks of the disk gang. These auxiliary frameworks provide means for varying the angle of the individual disk gangs and for securing the pull straps of the disk gang. A single hydraulic cylinder and piston is operatively connected to the supporting wheels and the tow bar by a link and lever system so that the entire rigid framework can be raised and lowered the same distance.

The nature and advantages of our invention will appear more fully from the following description and the accompanying drawings wherein a preferred embodiment of the invention is shown. The drawings and description are illustrative only and are not intended to limit the invention except insofar as it is limited by the claims.

In the drawings:

Figure 1 is a plan view of a disk harrow embodying our invention;

Figure 2 is an enlarged fragmentary sectional view taken on the line 2—2 of Figure 1;

Figure 3 is a plan sectional view looking upwardly from the line 3—3 of Figure 2;

Figure 4 is a view in side elevation of the disk harrow;

Figure 5 is a fragmentary front elevation view looking at Figure 4 in the direction indicated by the line 5—5 in Figure 4;

Figure 6 is a sectional view taken substantially on the line 6—6 of Figure 5 but showing the parts in a changed position;

Figure 7 is a fragmentary sectional view taken on the line 7—7 of Figure 2; and

Figure 8 is an enlarged fragmentary sectional view taken substantially on the line 8—8 of Figure 1.

Referring now to the drawings, the disk harrow is shown in Figure 1 as comprising four disk gangs 10, 11, 12 and 13, all of which are alike. The several gangs are secured to a rigid framework 14 in such a manner that they may be individually adjusted to the correct angle with respect to the direction of travel. The frame 14 is supported at three points by two wheels 15 and 16 and a tow bar 17 which is adapted to be supported by the towing vehicle (not shown).

The framework 14 comprises a central beam 18 which may be made of a standard I-beam or two channels welded to each other back to back. Two channel iron frame members 19 and 20 are welded to the beam 18 near the front end thereof and extend rearwardly and outwardly to points substantially over the outer ends of the rear disk gangs 12 and 13. At this point two channel irons 21 and 22 are welded to the channel irons 19 and 20 and extend inwardly at right angles to the channel irons 19 and 20 until they meet the beam 18. The inner ends of the channel irons 21 and 22 are welded to the beam 18. At the front end of the beam 18 two channel iron frame members 23 and 24 are welded. These frame members extend outwardly until they are substantially over the outer ends of the disk gangs 10 and 11. At this point the channel irons 23 and 24 are welded to the rearwardly extending channel irons 25 and 26 respectively that intersect the channel irons 19 and 20. At the point of intersection the channel irons 25 and 26 are welded to the channel irons 19 and 20. The frame members 25 and 26 are extended by additional channel irons 27 and 28 which are welded to the members 19 and 20 so as to extend in the same direction as the members 25 and 26. The channel irons 27 and 28 meet the beam 18 substantially at the rear end and are welded to it.

Bracing bars 29 and 30 connect the channel irons 19 and 20 with the beam 18. Gusset plates 31 and 32 are welded to the channel irons 23 and 25, and 24 and 26 respectively. To strengthen the intersection of the members 25 and 26 with the members 19 and 20, plates 33 and 34 are secured. These plates also provide additional strength to support an axle 35 for the wheels 15 and 16. At the rear end of the framework 14, the members 27 and 28 are connected to the beam 18 by cross braces 36 and 37, and reenforcing gussets 38 and 39 are provided across the angles between the members 19 and 20 and the members 21 and 22.

In order to connect the disk gangs to the frame 14 auxiliary frames 40, 41, 42 and 43 are used. These frames are essentially the same in detail and are best shown by Figures 1, 2 and 3. Each of the auxiliary frames comprises a front angle iron 44, a rear angle iron 45 and two interconnecting angle irons 46 and 47. The rear angle iron frame members 45 extend to and are pivotally secured on a pivot pin 48 that is provided on the beam 18. This is the inner point of connection of each of the auxiliary frames and provides a pivot about which the disk gangs swing to change their angle to the direction of travel. This construction is shown best in Figure 8 of the drawings. It will be noted that a strap 49 is bolted to the lower flanges of the beam 18 to provide a support for the pivot pins 48 and the inner ends of the frame members 45. The rear frame member 45 of each auxiliary frame is coupled to the corresponding disk gang frame by two pairs of clamp straps indicated by the numerals 50 and 51 on Figure 2. These clamp straps are fastened to the gang frame by bolts 52 and 53 (see Figure 2). The upper clamp strap 50 is then secured to the frame member 45 by a bolt 54. A spacer 55 is used to fill the space between the flange of the member 45 and the upper clamp strap.

It is a customary construction in the disk gang units to provide a pair of spaced bearings such as that shown at 56 in Figure 2 for the shafts 57 to which the disks 58 of a gang are secured. The disk gang frames 59 are connected to the bearings 56 by standards 60. The bearings 56 also serve as means of attachment of pull bars 61. These pull bars extend forwardly and upwardly and are provided with reduced ends 62 which extend through a plate 63 that is welded to the front frame member 44 of each auxiliary frame. There are two pull bars 61, one for each of the bearings 56, and these pull bars are preferably connected together by a cross brace 64 as shown in Figure 7. The upper end of the cross brace 64 is secured on the reduced extension 62 of the outer pull bar 61. The lower end of the cross brace 64 is bolted to a plate 65 that is welded on the inner pull bar 61. The pull bar 61 and the cross brace 64 are all preferably made of two telescoping sections threaded together as indicated in Figure 7, for adjustment in length.

In order to provide for angular adjustment of the auxiliary frames 40–43 inclusive, and the associated disk gangs, each of the gusset plates 31, 32, 38 and 39 is provided with a series of apertures 66 so that a bolt 67 through the frame member 46 of the auxiliary frame can be placed in the desired opening to give the proper angular relation. In addition the inner frame member 47 of the front auxiliary frames 40 and 41 has a bolt 68 extending through a curved slot 69 in bracing plates 29 and 30. There are two braces 19a and 20a connecting the channels 23 and 19 and the channels 24 and 20 respectively to add rigidity to the front of the frame. The bars 47 of the rear auxiliary frames 42 and 43 are likewise bolted by bolts 70 and slots 71 to the braces 36 and 37. With this construction it is evident that the disk gangs can be adjusted angularly from a position substantially at right angles to the beam 18 to the operating position shown in Figure 1 where the forward edges of the disks are properly positioned for maximum throw of soil.

The frame 14 must be raised and lowered to determine the depth to which the disk gangs will enter the soil. It is also desirable to have means whereby the disk gangs can be readily lifted out of the soil to permit the machine to cross a road or for any other purpose. It will be noted that the wheels 15 and 16 are mounted on arms 72 and 73. These arms are secured to the axle 35 which is suspended in bearings 74 which are provided on the lower plates 33' and 34' at the junction of the channel irons 19–25 and 20–26. A third bearing 75 is provided beneath the beam 18 for the mid portion of the axle 35. The axle 35 has two upstanding arms 76 and 77 fixed thereon on opposite sides of the bearing 75 and projecting above the beam 18. The arms 76 and 77 mount a shaft 78. A piston rod 79 of a hydraulic cylinder 80 is mounted on the shaft 78 between the arms 76 and 77 and two links 81 and 82 are mounted on the ends of the shaft 78 that extends beyond the arms 76 and 77. The cylinder 80 is mounted by a cross head 83 on two brackets 84 and 85 that are secured on the beam 18 at a distance forwardly from the bearing 75. Hydraulic fluid is supplied to the cylinder 80 by a flexible conduit 86 which usually leads to a pump and reservoir on the towing vehicle.

At the forward end of the frame 14, the tow bar 17 is secured by a tubular member 87 on a shaft 88 which is carried by two angle iron brackets 89—89 that are welded to the channels 23 and 24 and extend downwardly. A bracket 90 on the beam 18 supports a tubular bearing member 91 for a shaft 92. The shaft 92 carries two bell cranks 93 and 94. One arm 95 of the bell crank 93 is connected to the link 81 and the other arm 96 thereof is connected to a depending link 97 which is pivotally secured at its lower end to the tow bar 17. One arm 101 of the bell crank 94 is connected to the link 82, the other arm 99 of the bell crank 94 is connected to a depending link 98, the lower end of which is also pivotally secured to the tow bar 17. As shown best by Figures 4 and 6, the links 97 and 98 can be adjusted in length to a substantial degree so as to vary the angular position of the tow bar 17 with respect to the frame 14.

It will be evident from the foregoing description that when the piston rod 79 is pushed out by supplying fluid to the cylinder 80, the wheels 15 and 16 will be lowered to raise the frame 14 at the rear end. Likewise this same movement will cause the bell cranks 93 and 94 to push the links 97 and 98 downward, thus raising the front end of the frame 14 with respect to the hitching clevis 100 that is secured to the towing vehicle. The relative lengths of the arms 76 and 77 and the arms of the bell cranks 93 and 94 are so calculated that substantially the same amount of elevation is given to the front end of the frame when the wheels are lowered as is given to the rear end of the frame.

The links 97 and 98 are shown as adjustable in length to accommodate the disk to different draw bar heights of different towing vehicles or tractors. This adjustment can also be used to cause the frame 14 to be higher or lower at the front end than it is at the rear end. This feature is useful in the case where the front disk gangs may be of different diameters due to wear or other reasons, than the rear disk gangs. By tilting the frame 14 to the horizontal, the two sets of disk gangs can be made to penetrate to the same depth, even though the disks in one set are substantially smaller in diameter than those in the other set.

It is believed that the nature and advantages of our invention will be apparent from the foregoing description. Having thus described our invention, we claim:

1. In combination a rigid horizontal main frame, having a central beam extending from the front end to the rear end, four auxiliary frames suspended from the horizontal main frame, each auxiliary frame having an extended bar pivoted to the central beam and two other adjustable support connections to the main frame, a disk gang attached to each auxiliary frame, a tow bar having one end pivoted on a horizontal axis to the front end of the main frame and supporting said front end, said tow bar having means at its other end for supporting it on the draw bar of a towing vehicle, a transverse axle extending beyond the frame at both sides thereof, bearings on the main frame for said axle, wheel arms rigidly secured on the ends of said axle, a wheel at the end of each arm, the tow bar at the front and the wheels at the ends of said arms providing a three point support for the frame and the disks carried thereby a lever arm fixed to said axle, means connected to the lever arm for turning the axle in its bearings on the main frame, a bell crank pivoted on the front end of the main frame, a link connecting one arm of the bell crank to said tow bar, and a link connecting the other arm of the bell crank to the lever arm.

2. Means to mount and draw a plurality of disk gangs comprising a central longitudinal beam, two front frame members fixed to the beam at the front end thereof and diverging rearwardly, two rear frame members fixed to the beam at the rear end thereof and diverging forwardly, a frame member connecting the outer end of each front and rear frame member with the beam at a point adjacent to the remote end of the beam from the said outer end, a supporting axle extending transversely of the beam about midway thereof, bearings for said axle carried by said connecting frame members, wheels supporting said axle, a front pair of auxiliary frameworks pivoted to the beam and extending outwardly toward the outer ends of said front frame members, two other adjustable supporting connections mounting the auxiliary frameworks on the adjacent frame members, a rear pair of auxiliary frameworks pivoted to the beam and extending outwardly toward the outer ends of said rear frame members, two other adjustable supporting connections mounting the said rear auxiliary frameworks on the adjacent frame members, a disk gang depending from each auxiliary framework, and a tow bar secured to the front end of the beam.

References Cited in the file of this patent

UNITED STATES PATENTS

| | | |
|---|---|---|
| 1,013,382 | East | Jan. 2, 1912 |
| 1,648,381 | Flatley | Nov. 8, 1927 |
| 1,830,761 | Johnson | Nov. 10, 1931 |
| 2,025,257 | Vaughn et al. | Dec. 24, 1935 |
| 2,320,742 | Newkirk | June 1, 1943 |
| 2,458,091 | Moore | Jan. 4, 1949 |
| 2,469,622 | Acton | May 10, 1949 |
| 2,529,039 | Meyer | Nov. 7, 1950 |
| 2,599,065 | Newkirk | June 3, 1952 |

FOREIGN PATENTS

| | | |
|---|---|---|
| 344,298 | Italy | Nov. 3, 1936 |